(No Model.) 10 Sheets—Sheet 1.
L. H. JENKINS.
ROCK DRILL.
No. 571,231. Patented Nov. 10, 1896.
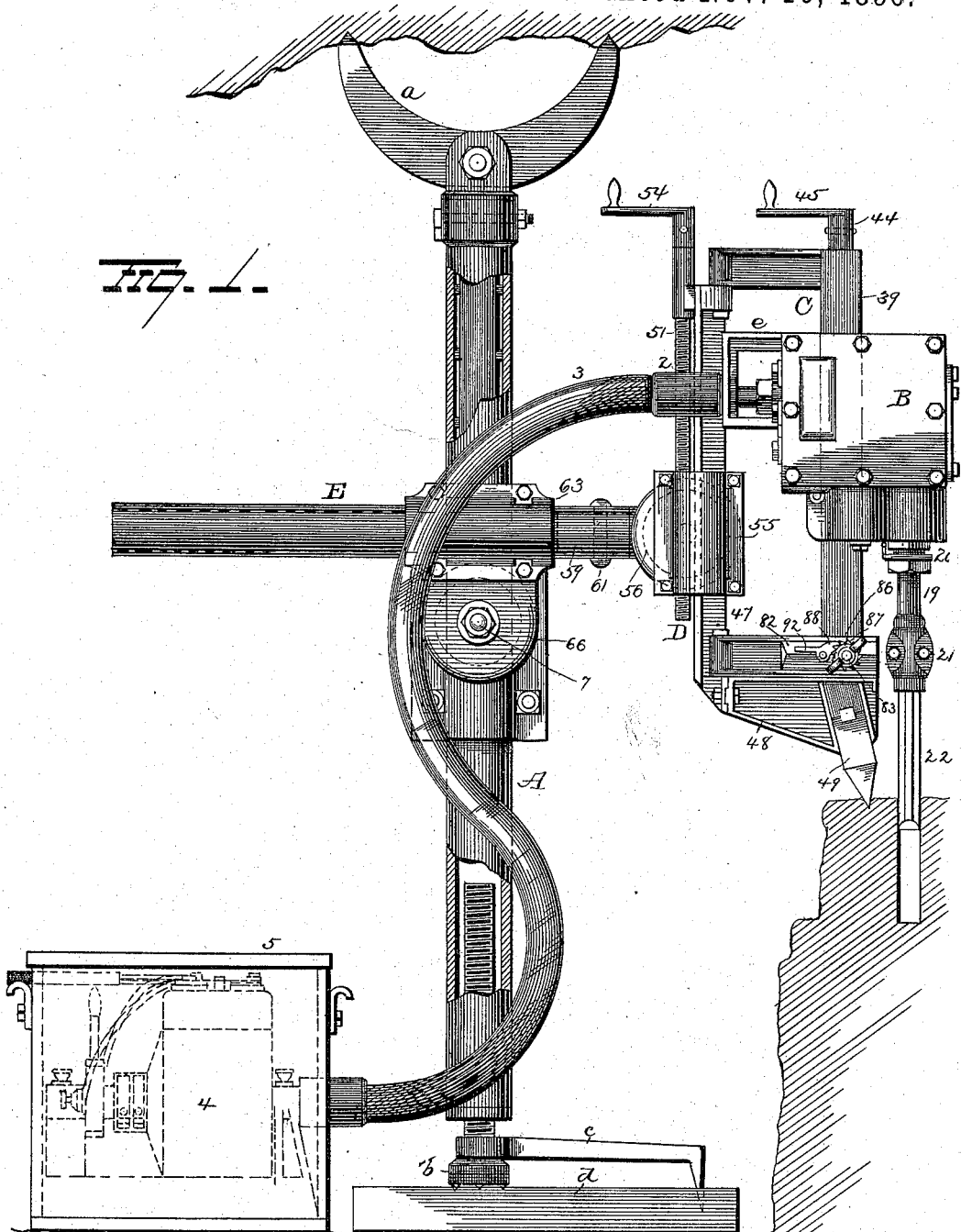
Witnesses
E. J. Nottingham
G. F. Downing
Inventor
L. H. Jenkins
By H. A. Seymour
Attorney

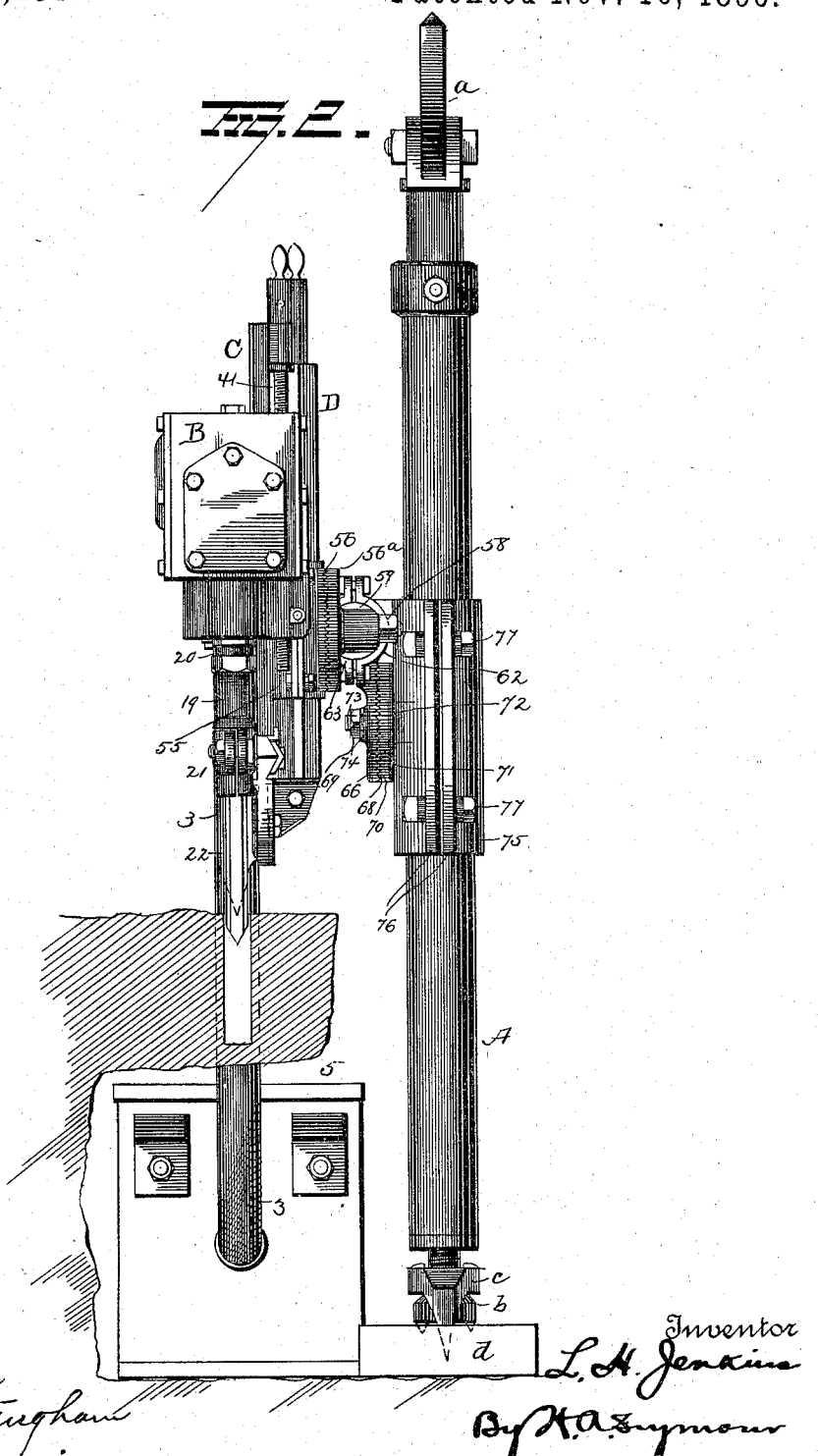

(No Model.) 10 Sheets—Sheet 3.
L. H. JENKINS.
ROCK DRILL.
No. 571,231. Patented Nov. 10, 1896.
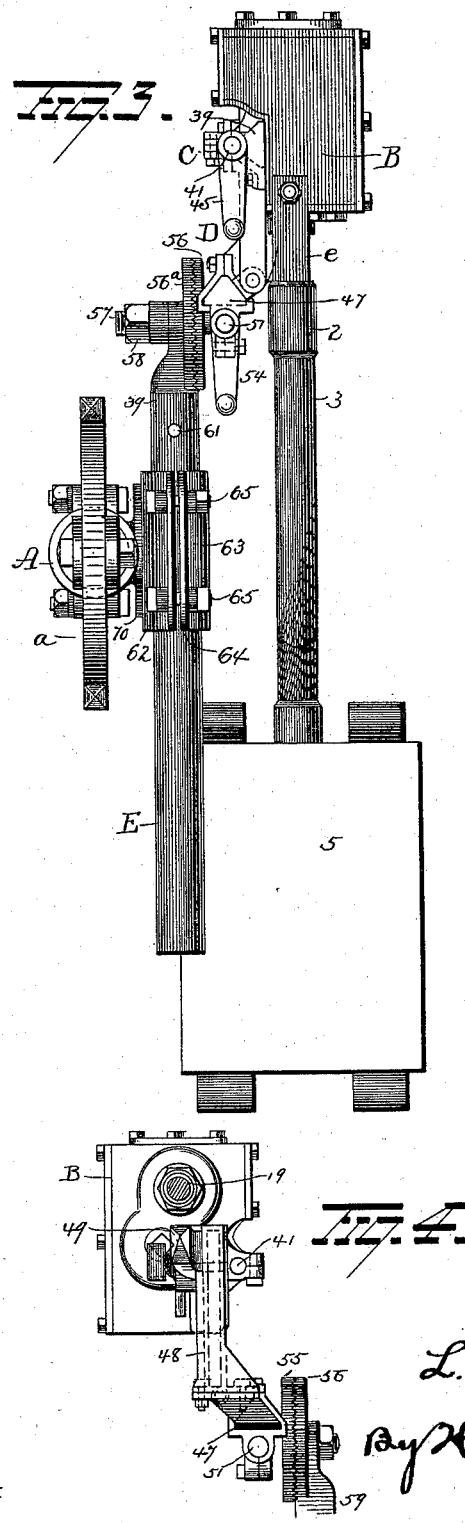

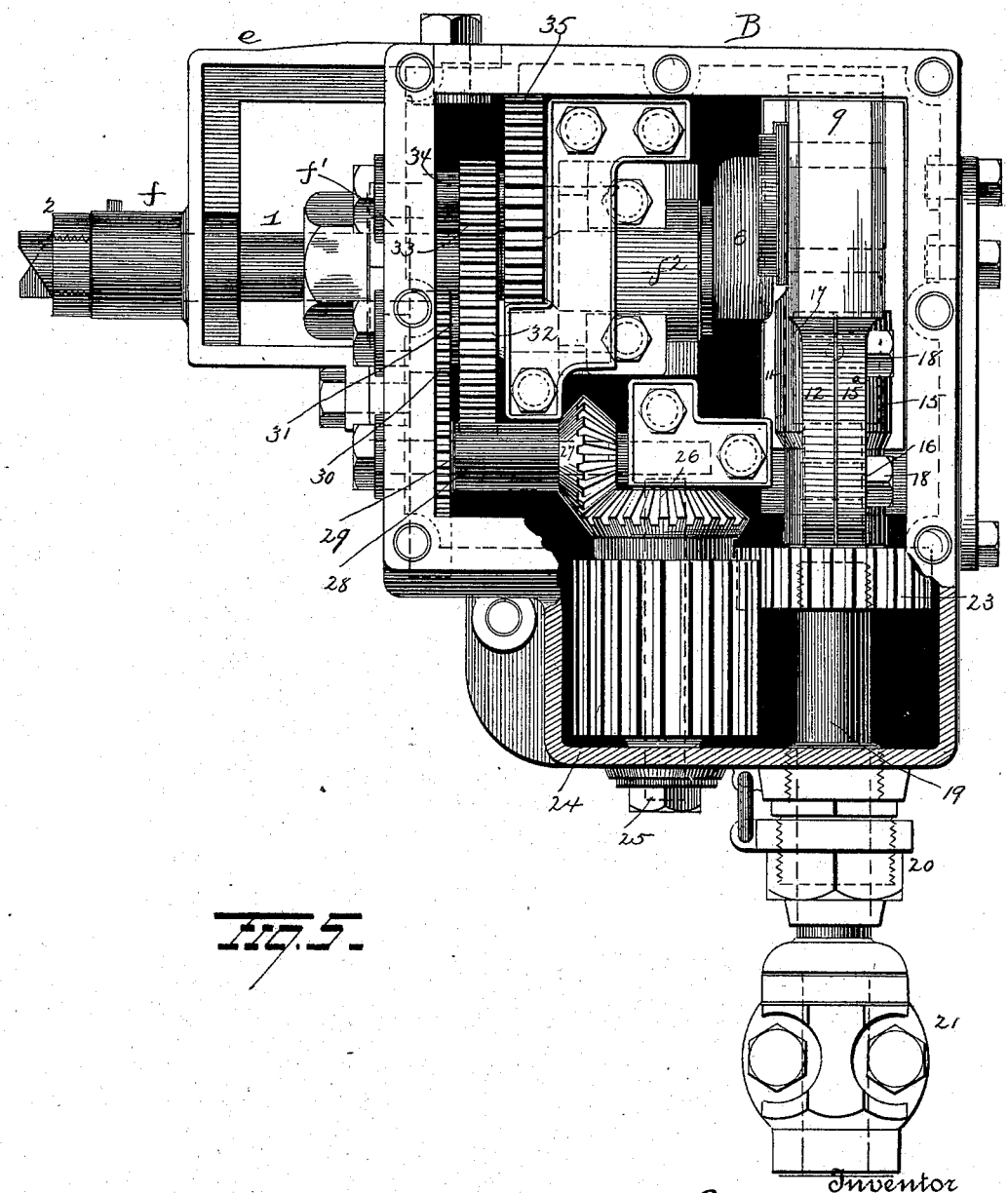

(No Model.)   L. H. JENKINS.   10 Sheets—Sheet 5.
ROCK DRILL.

No. 571,231.   Patented Nov. 10, 1896.

Witnesses
E. J. Nottingham
G. F. Downing

Inventor
L. H. Jenkins
By H. A. Seymour
Attorney (No Model.) 10 Sheets—Sheet 6.

L. H. JENKINS.
ROCK DRILL.

No. 571,231. Patented Nov. 10, 1896.

Witnesses
E. J. Nottingham
G. F. Downing

Inventor
L. H. Jenkins
By H. A. Seymour
Attorney

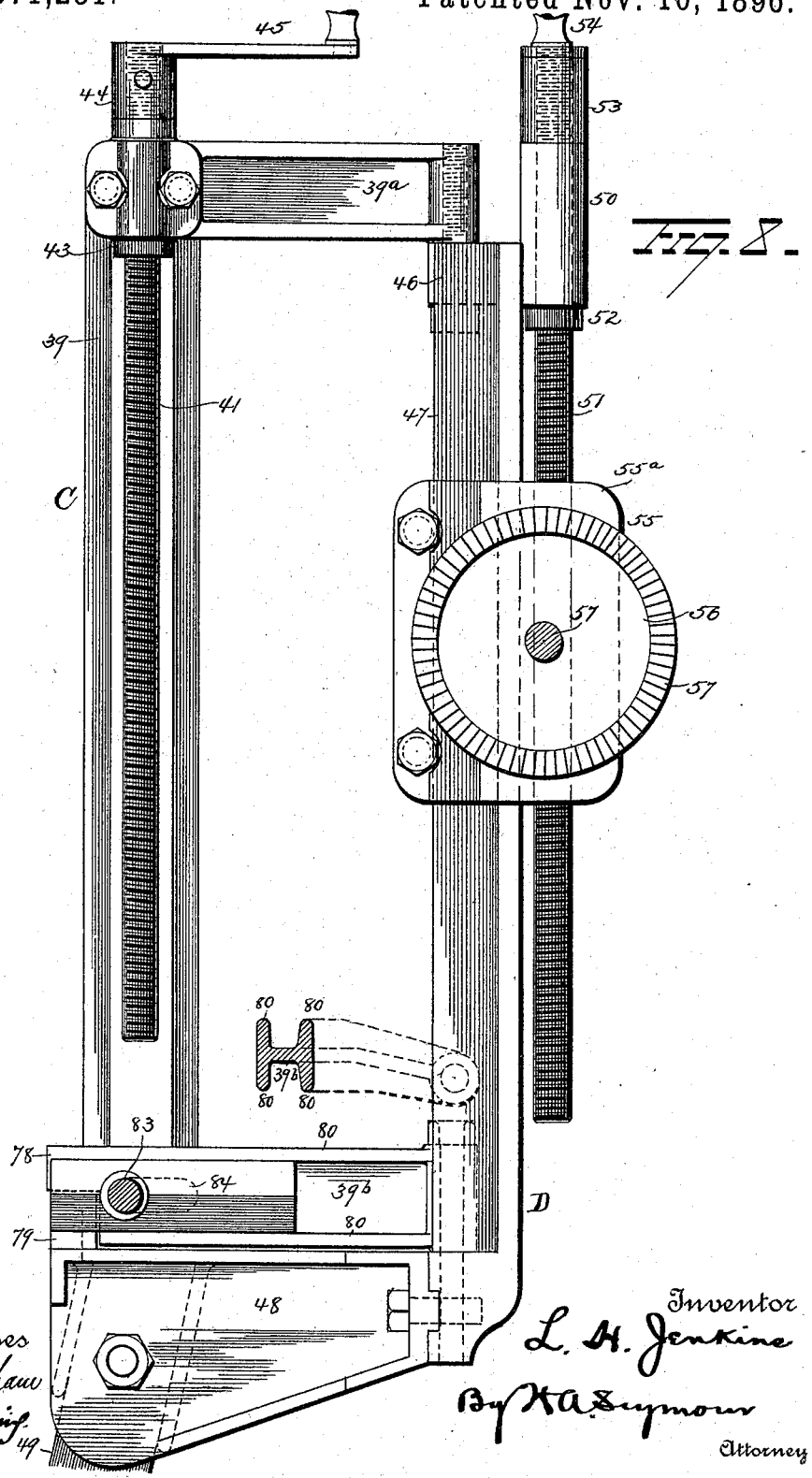

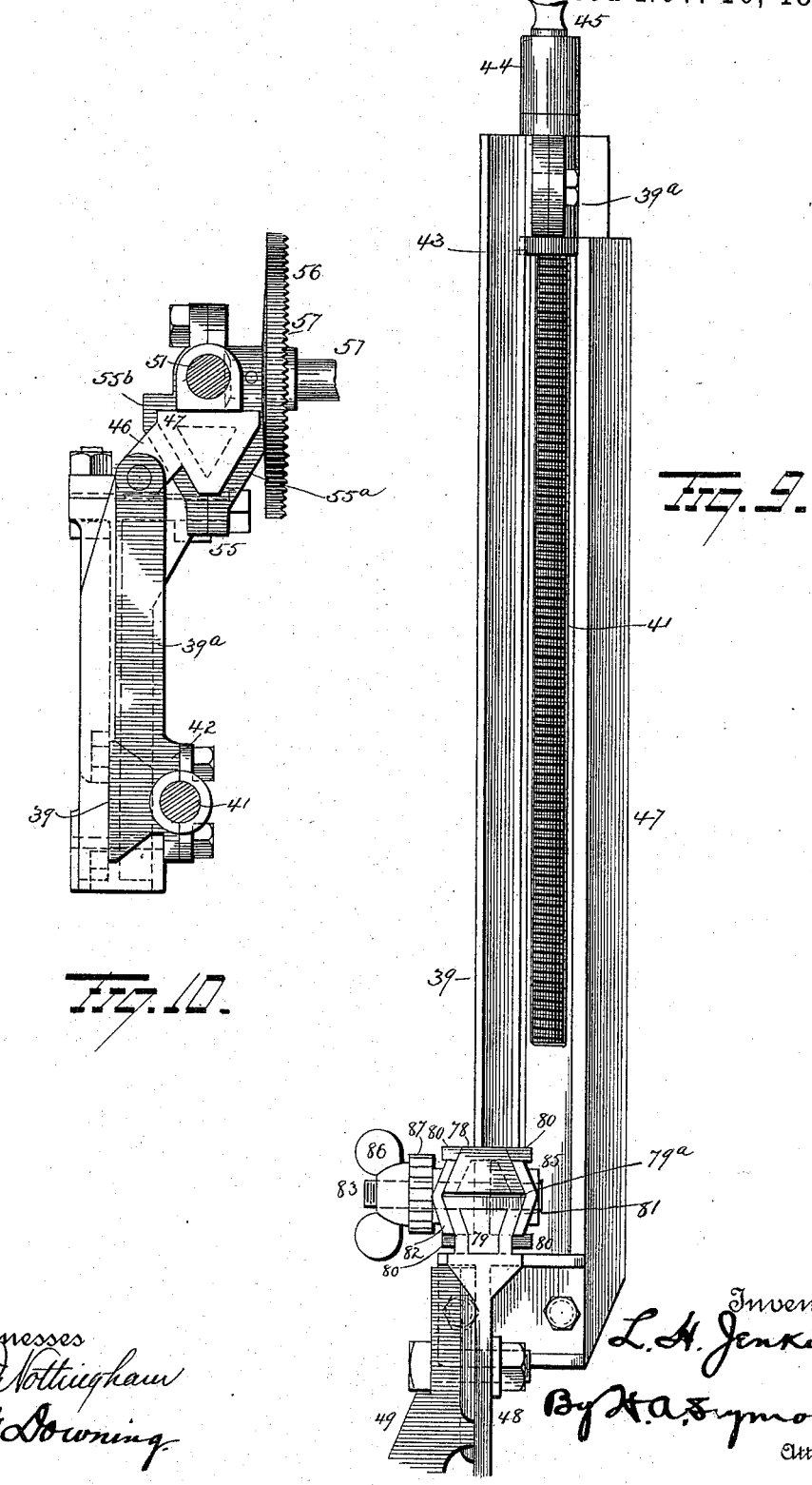

(No Model.) 10 Sheets—Sheet 9.

L. H. JENKINS.
ROCK DRILL.

No. 571,231. Patented Nov. 10, 1896.

Witnesses
E. J. Nottingham
G. F. Downing

Inventor
L. H. Jenkins
By H. A. Seymour
Attorney

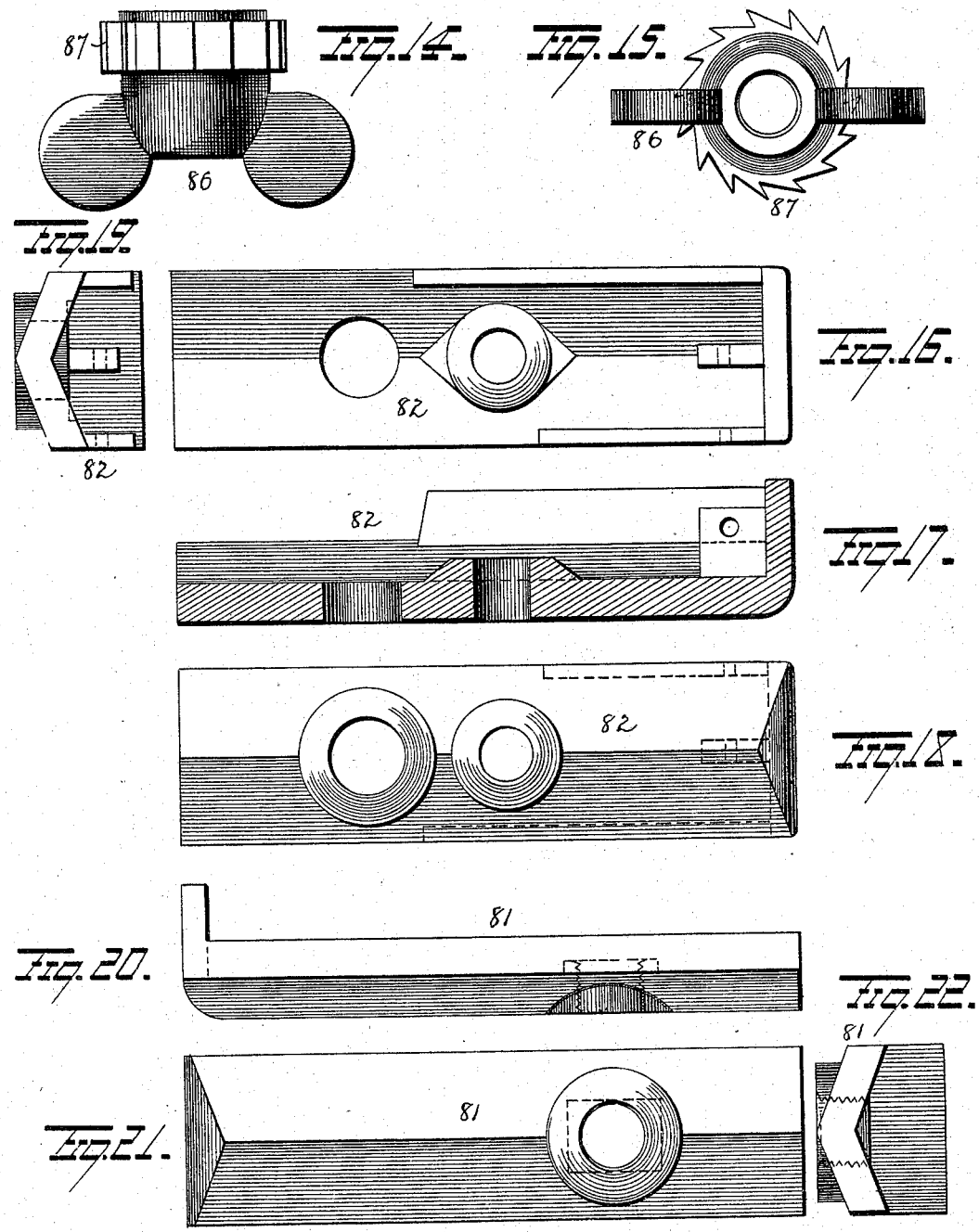

UNITED STATES PATENT OFFICE.

LEONA HOUSTON JENKINS, OF PHILADELPHIA, PENNSYLVANIA.

ROCK-DRILL.

SPECIFICATION forming part of Letters Patent No. 571,231, dated November 10, 1896.

Application filed June 13, 1895. Serial No. 552,713. (No model.)

*To all whom it may concern:*

Be it known that I, LEONA HOUSTON JENKINS, a resident of Philadelphia, in the county of Philadelphia and State of Pennsylvania, have invented certain new and useful Improvements in Rock-Drills; and I do hereby declare the following to be a full, clear, and exact description of the invention, such as will enable others skilled in the art to which it appertains to make and use the same.

My invention relates to an improvement in rock-drills; and it consists in certain novel features of construction and combinations and arrangements of parts, as hereinafter set forth, and pointed out in the claims.

Figure 6:
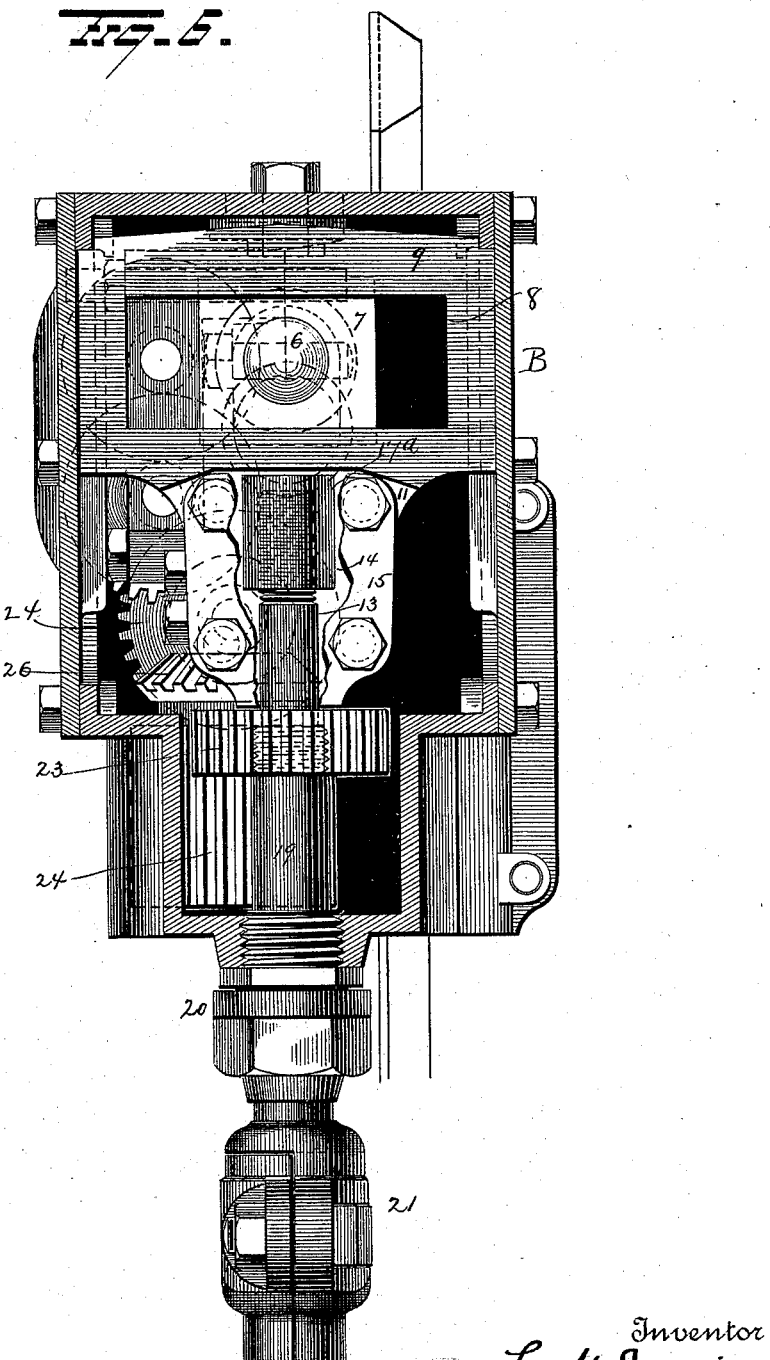
Figure 7:
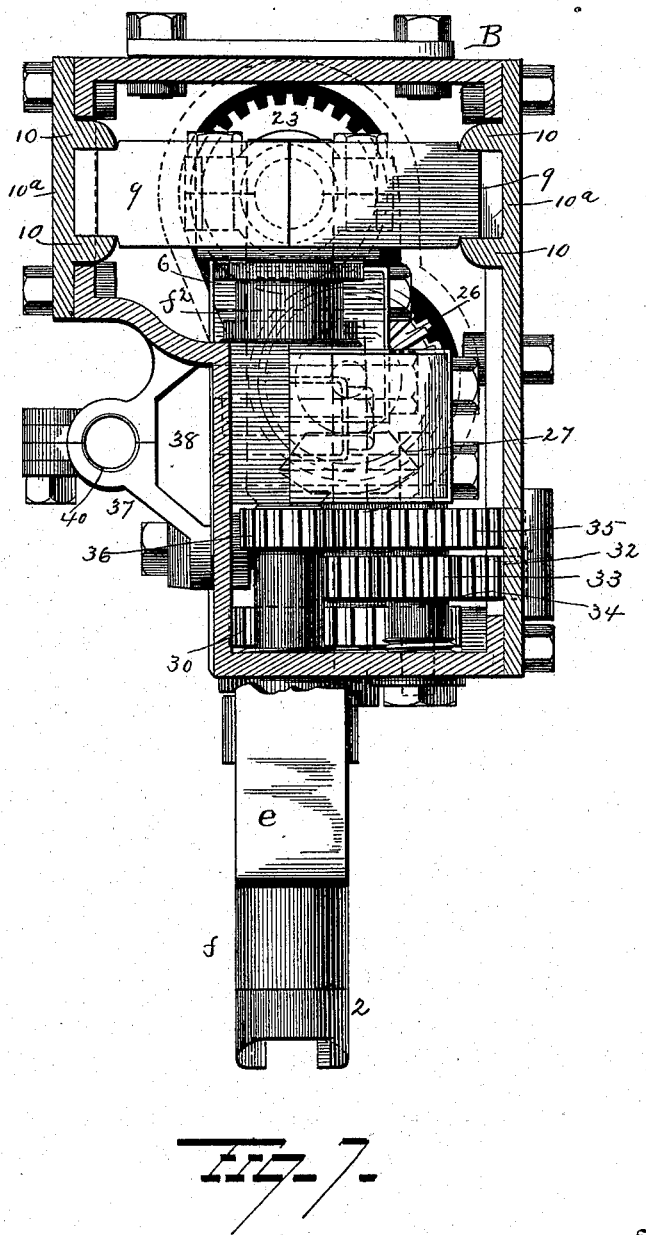
Figure 11:
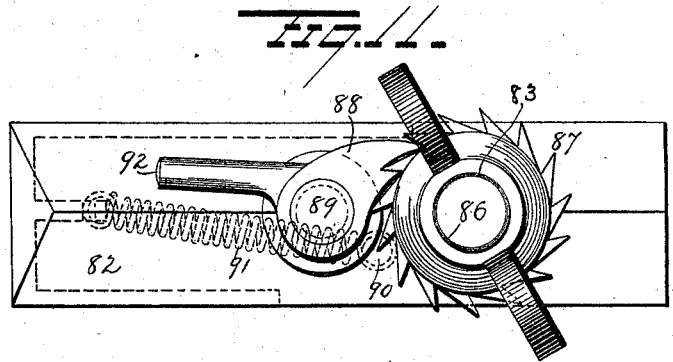
Figure 12:
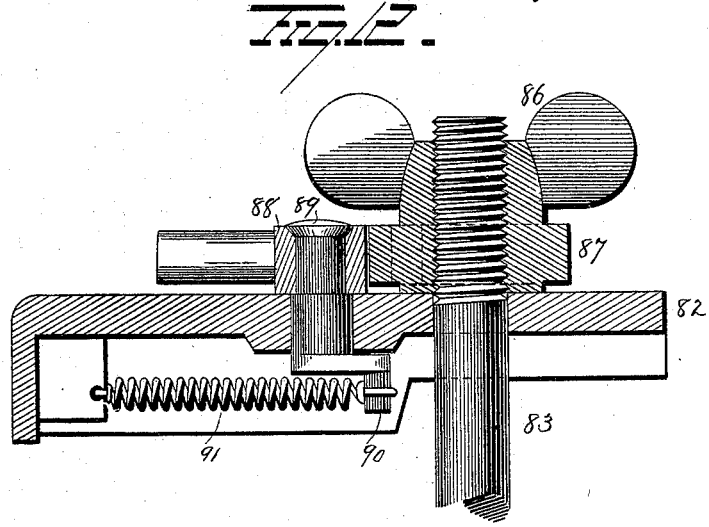
Figure 13:
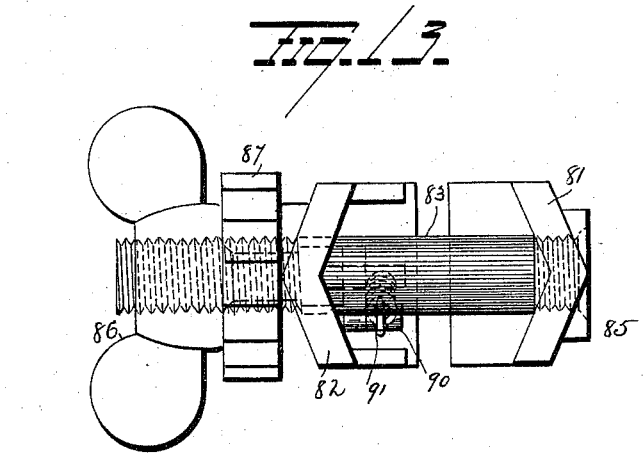

In the accompanying drawings, Figure 1 is a side elevation of my improved apparatus. Fig. 2 is a front view. Fig. 3 is a top plan view. Fig 4 is a bottom plan view with the connection with the supporting post or jacks omitted. Fig. 5 is a side elevation of the operating mechanism with side of casing removed and lower part of casing in section. Fig. 6 is a front elevation of the operating mechanism with the casing in section. Fig. 7 is a horizontal sectional view through the casing, showing a plan view of the operating mechanism. Fig. 8 is an enlarged elevation showing the main and supplemental frames and parts attached thereto. Fig. 9 is an edge view of the same. Fig. 10 is a plan view of said frames and connected parts. Figs. 11, 12, 13, 14, 15, 16, 17, 18, 19, 20, 21, and 22 are detail views.

A represents a supporting post or jack of any preferred form of construction, but preferably having a U-shaped arm $a$ at its upper end to engage the roof of the chamber of rock in which the drill is operated and having a toothed foot $b$ and a toothed arm $c$ at its lower end to engage a wooden block $d$ on the floor of said chamber. B represents a casing for inclosing the operating mechanism of the drill; C, a main frame connected with the casing, and D a supplemental frame pivotally connected with the main frame and with an adjustable bar E, connected with the supporting post or jack A, all of which parts are constructed, connected together, and adapted to operate in the manner hereinafter specifically pointed out.

The casing B is provided with a bracket $e$ for the accommodation of a journal-bearing $f$, a similar journal-bearing $f'$ being placed in an opening in the wall of the casing and another journal-bearing $f^2$ being located within said casing. In said journal-bearings a shaft 1 is mounted and provided at one end with a clutch device 2 of any preferred form of construction for the attachment of a flexible shaft 3 thereto, the other end of the flexible shaft being connected with the driving-shaft of a motor, preferably an electric motor 4, and the latter is preferably inclosed within a box or casing 5, whereby to protect said motor from dirt or other injurious external influences. The other end of the shaft 1 terminates in a crank-arm 6, mounted loosely in a block 7, adapted to slide in a transverse opening 8 in a cross-head 9. The cross-head 9 is mounted to reciprocate between guides 10 10 on removable plates $10^a$ in the casing B, and is made with an arm or extension 11, having lateral flanges 12 and semicircular recesses 13 14, the latter being somewhat enlarged.

A cap 15, having flanges $15^a$ and recesses 16 17, corresponding with the recesses 13 14, is secured to the arm or extension 11 by means of bolts 18 passing through the flanges 12 $15^a$. The upper portion of a drill-rod 19 is inclosed within the recesses 13 16 and provided with a head $17^a$, disposed within the recesses 14 17, and thus the drill-rod is connected with the reciprocating cross-head.

The drill-rod passes down through the bottom of the casing B and through a suitable stuffing box or boxes 20, connected therewith, the lower extremity of said drill-rod being provided with a suitable clamp 21 for the reception of a bit or tool 22 of any desired form of construction. From this construction and arrangement of parts above described it will be seen that when the crank-shaft 1 is rotated reciprocating motion will be imparted to the cross-head 9 and the drill carried thereby.

To the drill-rod 19 a gear-wheel 23 is secured and adapted to mesh with a gear-wheel 24, having elongated teeth, carried by a vertical shaft 25, mounted in suitable bearings in the casing B, rotary motion being imparted from the elongated gear 24 to the gear-wheel 23 on the drill-rod during the reciprocation of the latter, and from one extremity of the movement thereof to the other. The drill-rod will thus be simultaneously reciprocated and rotated, and the rotary motion will be transmitted from the crank-shaft 1 (which, as above explained, serves also to supply power for reciprocating the drill-rod) to the elongated pinion in a manner which will now be described.

A bevel-pinion 26 is mounted to rotate with the elongated gear 24 and receives motion from a bevel-pinion 27, carried by a horizontal shaft 28, mounted in suitable bearings in the casing B. The shaft 28 also carries a gear 29, which receives motion from a pinion 30, carried by a short shaft 31. The shaft 31 also carries a gear-wheel 32, which receives motion from a pinion 33, carried by a shaft 34. The shaft 34 carries a gear-wheel 35, which receives motion from a pinion 36 on the crank-shaft 1, motion being imparted to the latter from the motor 4 through the medium of the shaft 3, as above explained.

The casing B is provided on one side with a yoke-shaped portion or enlargement 37, having a dovetailed opening 38, through which a guide-bar 39 passes, and the latter serves, as presently explained, to support the casing B and all the parts carried thereby. The yoke or enlargement 37 is also made with a screw-threaded opening 40 for the accommodation of a feeding-screw 41. The upper portion of the screw 41 is made plain, i. e., without threads, and passes loosely through a perforated boss or enlargement 42 on the guide-bar 39, the screw being prevented from longitudinal movement relatively to bar 39 in one direction by means of a collar 43 and in the other direction by a sleeve 44, secured to the upper end of the screw and constituting the hub of an operating crank or handle 45. By operating the screw 41 the casing and the drill mechanism carried thereby will be fed forward.

From the respective ends of the guide-bar 39 arms $39^a$ $39^b$ project laterally and are preferably made integral with said guide-bar, said arms and the guide-bar constituting the main supporting-frame C for the casing B and the drill mechanism carried thereby. The free end of the arm $39^a$ is pivotally connected with a perforated enlargement 46 at the upper end of a locking guide-bar 47, and the free end of the arm $39^b$ of the main frame is pivotally connected with the lower end of said bar 47.

To the lower end of the locking guide-bar a bracket-arm 48 is securely bolted, and a steadying rest or arm 49 is bolted to the bracketed arm and adapted to engage the rock near the point where the drill-bit is to enter the same. The bar 47, bracketed arm 48, and rest 49 constitute the supplemental frame D, hereinbefore referred to, which is arranged to support the weight of the entire apparatus and to stand the strain necessary to hold the drill steady when drilling and withstand the consequent shock.

The upper end of the bar 47 of the supplemental frame is provided with a lateral perforated boss or sleeve 50, through which the upper plain portion of a screw 51 passes, longitudinal movement of said screw in the boss or sleeve 50 in one direction being prevented by a collar 52 and in the other direction by a sleeve 53, secured to the upper end of said screw, said sleeve 53 constituting the hub of an operating arm or handle 54. The screw 51 is disposed parallel with the locking guide-bar 47, and said screw and bar are embraced between their ends by a cross-head 55, the portion of the cross-head through which the screw passes being made with screw-threads for the accommodation of the same.

The cross-head 55 is made in two parts $55^a$ $55^b$, and said parts are firmly bolted together. The part $55^a$ of the cross-head 55 is provided with a disk 56, having an annular flange at its periphery projecting at right angles to its face, and in said flange a number of slots or grooves 57 are made to form an annular series of radial teeth adapted to mesh with similar teeth or projections on the outer face of a disk $56^a$. The disks 56 $56^a$ are connected together by means of a bolt 57 passing through perforations in their center, said bolt being screw-threaded at its end for the reception of a nut 58, whereby to maintain the two disks in mesh with each other, and thus prevent them from slipping.

A tubular arm or extension 59 projects from the disk $56^a$ in a direction parallel with the face thereof, and it is inserted into one end of the adjustable bar E and securely fastened by means of a pin or bolt 61, said adjusting-bar being preferably composed of a section of steel tubing.

The bar E projects between clamping-plates 62 63, having flanges 64, through which bolts 65 are passed and adapted to retain the bar E securely clamped in any desired adjustment between the clamping-plates 62 63, the latter being, of course, of proper shape to conform to the shape of said adjusting-bar. The clamping-plate 62 is made with a depending disk 66, having an annular flange provided with grooves or notches to form radial teeth 68, and said disk is made in its center with an opening 69. The radial teeth 68 are adapted to mesh with a similar series of teeth 70, made on the face of a disk 71. The disk 71 is made with a central hole 72 for the accommodation of a bolt 73, the end of which is screw-threaded for the reception of a nut 74, whereby the teeth on said disks are maintained normally in mesh with each other and the disks prevented from slipping. The disk 71 is carried by a sectional sleeve or clamp 75, having perforated flanges 76, through which bolts 77 are passed, whereby to rigidly secure said sectional sleeve to the supporting post or jack A.

By means of the adjustable connections between the various parts it will be seen that the drill carried by the casing B can be disposed at any adjustment desired and that when the desired adjustment shall have been made the apparatus will be held firmly and steady to its work.

As before stated, the main frame C is pivotally connected with the supplemental frame D, and thus a perfect hinged connection is made between said frames. This feature forms an important part of my invention, for the strength and support of the supplemental frame D which carries the main frame C, and locking the whole framework to the rock by forcing it down by means of the screw 51, until the steadying rest or arm 49 engages the rock, make the main frame very valuable The axial motion of the clamp 75 on the post or column A in a horizontal plane, the vertical axial motion of the two sets of corrugated or toothed disks in line with the adjustable bar, and the axial movement of said bar itself when turned around in its clamp all combine to permit a perfect universal adjustment of the supplemental frame D and the apparatus connected therewith and supported thereby, and the various connections are so made that when set and fastened none of them can possibly slip.

When the cross-head 55 is rigidly held by the adjustable bar E and the supporting post or column A, and the locking-screw 51 is turned, the locking guide-bar 47 of the supplemental frame D will be forced downwardly through the cross-head 55, carrying the bracketed arm 48 and steadying rest or arm 49 until the latter will rest on the rock with perfect rigidity, thus enabling the main frame C to hold the drill steady, and by such steady support only can the said main frame C be of use, and with it I am enabled to swing said main frame carrying the drill mechanism laterally to either side from the hole being drilled when it is desired to "spoon out" the pulverized rock, change the bit, or for any other purpose, and when the main frame C is thus swung laterally it can be made to resume its normal working position without the slightest deviation from that which it originally occupied. To secure the main frame C in proper working position relatively to the bracketed arm of the supplemental frame, and also to provide means for quickly disconnecting them, I provide devices which I will now describe.

The forward end of the arm $39^b$ of the main frame C is formed with a reduced extension or flange 78, which is of dovetailed form in cross-section. A dovetailed flange 79 is made on the bracketed arm 48 and abuts against the reduced extension or flange 78 of the arm $39^b$, the two parts 78 79, when placed together, forming a hexagon $79^a$ in cross-section. The arm $39^b$ is made at its outer edges on each side with guide ribs or flanges 80, between which small plates 81 82 are respectively placed and adapted to slide, one on each side of the hexagonal device $79^a$, formed by the parts 78 79, and the forward ends of the plates 81 82 are formed to snugly fit said hexagonal device and hold the same together.

A bolt 83 is passed through the plates 81 82 and an elongated slot 84 in the arm $39^b$. One end of this bolt is threaded to enter an enlargement on the plate 81, thus in effect securing the bolt to said plate. The other end of the bolt 83 projects outwardly beyond the plate 82 and is screw-threaded for the reception of a thumb-nut 86, whereby to clamp the two plates in position against the outer faces of the hexagonal device $79^a$, formed by the two flanges or extensions 78 79. In order to prevent the accidental displacement or loosening of the plates 81 82, the thumb-nut 86 is made with a ratchet-wheel 87, adapted to be engaged by a dog 88, pivotally connected to the plate 82. The pivot-pin 89 of said dog is mounted to oscillate in the plate 82 and at its inner end is provided with a crank-arm 90, to which one end of a spring 91 is secured, the other end of the spring being attached to the said plate 82 and serving to retain the dog in contact with the teeth of the ratchet-wheel, said dog and ratchet-wheel thus constituting a lock for the nut 86, and the dog will preferably be provided with an arm or handle 92, by which it can be disengaged from the ratchet-wheel. By disengaging the dog from the ratchet-wheel and loosening the nut 86 the plates 81 82 can be slid longitudinally, the bolt 83 moving in the slot 84 until the front ends of said plates shall become disengaged from the flanges or extensions 78 79 of the arms $39^b$ 48, thus releasing said arms from each other and permitting the main frame C and the drill mechanism carried thereby to be swung on the hinged connection of said main frame with the supplemental frame D laterally in either direction, as above explained.

The operation of my improved drill is as follows: The supporting post, column, or jack A is placed in position and secured between the floor and roof of the chamber of rock in which the drill is to be operated. The clamp or sleeve 75 is then secured to the post or column, and adjustable bar E and its clamping-plates 62 63 secured in position, and finally the supplemental frame D and parts connected therewith are placed in position. The adjustable parts will be loosened and the drill adjusted to the desired position for drilling a hole in the rock at the desired place and angle, after which the adjustable parts will be tightened. Then by turning the locking-screw 51 the steadying rest or arm 49 will be forced hard against the rock at a point near where the drill-bit is to operate and the apparatus will be in position for work. A bit of the desired form and length will be placed in position in the clamp provided for its reception, the flexible shaft 3 connected with the crank-shaft 1, and a suitable electric switch manipulated to start the electric motor 4, and the operation of the drill will be started. The drill will be gradually fed forward by manipulating the feed-screw 41.

When it is desired to spoon out the hole in the rock or change bits, the drill can be stopped by manipulating the clutch device 2, by which the shafts 1 and 3 are united. The drill will then be run backwardly by turning the screw 41 backwardly until the drill-bit has cleared the rocks. The connection between the arms 39$^b$ 48 of the frames C D will then be severed in the manner above explained, whereupon the main frame C can be swung around, as above described, so as to permit the hole in the rock to be cleaned out or to permit the changing of bits. The parts can be easily brought back to their working positions by the readjustment of the parts last above described.

My improvements are comparatively simple in construction, easy to operate and control, and effectual in all respects in the performance of their functions.

Numerous slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a rock-drill, the combination with a casing and a supporting-post, of a main frame adjustably connected with said casing, a supplemental frame having a hinged connection with the main frame, an axially-adjustable bar adapted to be disposed at an angle to said support, an adjustable connection between said bar and support and an adjustable connection between said bar and supplemental frame, substantially as set forth.

2. In a rock-drill, the combination with a casing, and a support, of a main frame connected with the casing, a supplemental frame pivotally connected with the main frame and adjustably connected with the support, angular flanges on said frames movable angular plates adapted to engage said angular flanges, a bolt passing through said plates and a slot in an arm of the frames, a nut on said bolt, a ratchet-wheel on said nut, a spring-actuated dog adapted to engage said ratchet-wheel and a handle on said dog, substantially as set forth.

3. In a rock-drill, the combination with a casing and a support, of a main frame connected with said casing, a supplemental frame connected with said main frame, endwise-sliding adjustable connections between said supplemental frame and support, and a feed-screw connected with the casing and main frame, whereby to feed said casing forward and a similar screw connected with the supplemental frame and the support for moving the supplemental frame endwise, substantially as set forth.

4. In a rock-drill, the combination with a casing and a support, of a main frame adjustably connected with the casing, a supplemental frame hinged to the main frame, means for locking said frames together, a bar having a longitudinal, axial and pivoted adjustable connection with said support, and an adjustable connection between said bar and the supplemental frame, substantially as set forth.

5. In a rock-drill, the combination with a casing and a supporting-post, of a yoke on said casing, a guide-bar adjustably connected with said yoke, arms projecting from said guide-bar, a locking-bar pivotally connected to said arms, an arm rigidly secured to said locking-bar, a steadying rest or support secured to said last-mentioned arm, and connections between said locking-bar and said supporting-post, substantially as set forth.

6. In a rock-drill, the combination with a casing and a supporting-post, of a guide-bar adjustably connected with the casing, arms projecting from the guide-bar, a locking-bar pivotally connected with the free ends of said arms, an arm rigidly secured to said locking-bar, a steadying rest or arm secured to said last-mentioned arm, means for moving said locking-bar downwardly to cause the steadying rest or arm to engage the rock, and connections between said locking-bar and supporting-post, substantially as set forth.

7. In a rock-drill, the combination with a casing and a supporting-post, of a frame adjustably connected with said casing, a supplemental frame, a screw-threaded rod passing through a perforated enlargement on the supplemental frame, a yoke embracing said supplemental frame and having a screw-threaded opening for the passage of said screw, a corrugated disk carried by said yoke, a similarly-corrugated disk carrying a tubular arm and adapted to mesh with the above-mentioned corrugated disk, a bolt passing centrally through said disks and retaining them in mesh, an adjustable bar secured to said tubular arm, and an adjustable connection between said adjustable arm and supporting-post, substantially as set forth.

8. In a rock-drill, the combination with a casing adapted to contain drilling mechanism, and a supporting-post, of a clamping-sleeve adjustably secured to the supporting-post, a corrugated disk carried by said clamping-sleeve, clamping-plates, a bar adjustably held between said clamping-plates, a corrugated disk on one of said clamping-plates and adapted to mesh with the first-mentioned corrugated disk, a bolt passing centrally through said corrugated disks and adapted to retain said disks in mesh with each other and connections between said adjustable bar and casing, substantially as set forth.

9. In a rock-drill, the combination with a casing and supporting devices of a reciprocating cross-head mounted in the casing, a crank-shaft adapted to reciprocate said cross-head, an arm or extension on the cross-head having a recess with an enlarged upper portion, a cap secured to said arm or extension and having recesses corresponding with the recesses in the arm or extension, and a drill-rod projecting through the recesses in the arm or extension and cap and having a head to enter the enlarged portions of said recesses, substantially as set forth.

10. In a rock-drill, the combination with a casing and supporting devices, of a reciprocating cross-head in said casing, a crank-shaft adapted to reciprocate said cross-head, a revoluble drill-rod carried by said cross-head, a pinion on said drill-rod, a shaft mounted parallel with the drill-rod, an elongated gear on said shaft meshing with the pinion on the drill-rod, and gearing between the said shaft and the crank-shaft, substantially as set forth.

11. In a rock-drill, the combination with a casing, of a reciprocating cross-head in said casing, a drill-rod carried by said cross-head, a crank-shaft adapted to reciprocate said cross-head, a pinion on the drill-rod, a shaft parallel with the drill-rod, an elongated gear on said shaft meshing with the pinion on the drill-rod, a bevel-pinion on said shaft, a horizontal shaft, a bevel-pinion on the horizontal shaft and meshing with said first-mentioned beveled pinion, a pinion on the crank-shaft and gearing between the pinion on the crank-shaft and the said horizontal shaft, substantially as set forth.

12. In a rock-drill, the combination with a casing, of a reciprocating cross-head in said casing, a crank-shaft adapted to reciprocate said cross-head, a drill-rod revolubly connected with said reciprocating cross-head, a pinion or spur wheel made integral with the drill-rod, an elongated gear meshing with said pinion or spur wheel, a pinion on the crank-shaft, and gearing between said pinion and the elongated gear-wheel, substantially as set forth.

13. In a rock-drill, the combination with a casing having removable plates which constitute a part of the casing and complete it when in position, of guides carried by said removable plates, a cross-head adapted to reciprocate between said guides, a drill-rod carried by said cross-head, and means for reciprocating said cross-head and rotating the drill-rod, substantially as set forth.

14. In a rock-drill, the combination with a casing and stuffing-boxes or bearings, of a crank-shaft or drill-rod mounted in said stuffing-boxes or bearings and extending at one end beyond the casing, a cross-head adapted to be reciprocated by said crank-shaft, said cross-head connected to the drill-rod, a clutch at the free end of said crank-shaft, a bracket on the casing, a supplemental bearing in said bracket for the clutch-casing and a flexible shaft connected with said clutch, substantially as set forth.

In testimony whereof I have signed this specification in the presence of two subscribing witnesses.

LEONA HOUSTON JENKINS.

Witnesses:
EMMA W. KIRKEN,
VIOLET M. JENKINS.